(12) United States Patent
Bowen et al.

(10) Patent No.: US 9,082,252 B2
(45) Date of Patent: *Jul. 14, 2015

(54) AUTOMATED BANKING MACHINE THAT OPERATES RESPONSIVE TO DATA BEARING RECORDS

(71) Applicant: Diebold Self-Service Systems, division of Diebold, Incorporated, North Canton, OH (US)

(72) Inventors: Bruce Bowen, Chepachet, RI (US); Lee Kravitz, Ellicott, MD (US); James Trocme, Moreland Hills, OH (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,152

(22) Filed: Mar. 25, 2014

(65) Prior Publication Data

US 2014/0203074 A1 Jul. 24, 2014

Related U.S. Application Data

(63) Continuation of application No. 13/622,734, filed on Sep. 10, 2012, now Pat. No. 8,678,275.

(60) Provisional application No. 61/626,196, filed on Sep. 22, 2011.

(51) Int. Cl.
*G07F 19/00* (2006.01)
*G06Q 40/00* (2012.01)
*G06Q 20/10* (2012.01)
*G06Q 20/40* (2012.01)
*G09B 21/00* (2006.01)
*G06Q 20/18* (2012.01)

(52) U.S. Cl.
CPC .............. *G07F 19/20* (2013.01); *G06Q 20/108* (2013.01); *G06Q 20/1085* (2013.01); *G06Q 20/18* (2013.01); *G06Q 20/40* (2013.01); *G07F 19/201* (2013.01); *G07F 19/205* (2013.01); *G09B 21/006* (2013.01); *G09B 21/008* (2013.01)

(58) Field of Classification Search
USPC ........................ 235/379, 375, 381; 705/39–45
See application file for complete search history.

(56) References Cited

U.S. PATENT DOCUMENTS 6,061,666 A * 5/2000 Do et al. .......................... 705/43
6,464,135 B1 * 10/2002 Cohen et al. ................... 235/379

* cited by examiner

*Primary Examiner* — Tuyen K Vo
(74) *Attorney, Agent, or Firm* — Black McCuskey Souers & Arbaugh, LPA

(57) ABSTRACT

An automated banking machine system operates to cause financial transfers responsive to data read from data bearing records. The system is operative to read a financial card bearing account indicia with a card reader. A user is able to perform at least one banking operation responsive to account indicia read by the card reader from the card. The banking operations include dispensing cash and accessing financial accounts. In an example embodiment, the machine is operative to produce an audio output including verbal information through a headphone port to a headphone.

17 Claims, 9 Drawing Sheets

AUTOMATED BANKING MACHINE THAT OPERATES RESPONSIVE TO DATA BEARING RECORDS

CROSS REFERENCE TO RELATED APPLICATIONS

This application is a continuation of U.S. patent application Ser. No. 13/622,734 filed Sep. 10, 2012 which claims priority under 35 U.S.C. §119 to U.S. Provisional application 61/626,196 filed on Sep. 22, 2011. The contents of the aforementioned applications are hereby incorporated by reference in their entirety.

TECHNICAL FIELD

An exemplary embodiment relates to automated banking machines that operate to cause financial transfers responsive to data read from data bearing records which may be classified in U.S. Class 235, Subclass 379.

BACKGROUND

Automated banking machines are well known. A common type of automated banking machine used by consumers is an automated teller machine. Automated banking machines enable customers to carry out banking transactions. Common banking transactions that may be carried out with automated banking machines include the dispensing of cash, the receipt of deposits, the transfer of funds between accounts, the payment of bills and account balance inquiries. The type of banking transactions a customer can carry out are determined by capabilities of the particular automated banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers' checks. For purposes of this disclosure, references to an automated teller machine, an automated banking machine or automated transaction machine shall encompass any device which carries out automated transactions including transfers of value.

OBJECTS OF EXEMPLARY EMBODIMENTS

It is an object of an exemplary form of at least one embodiment to provide an automated banking machine at which a user may conduct transactions.

It is a further object of an exemplary form of at least one embodiment to provide an automated banking machine that may be operated by consumers with normal vision.

It is a further object of an exemplary form of at least one embodiment to provide an automated banking machine that may be operated by consumers with impaired vision.

Further objects of exemplary embodiments will be made apparent in the following

DETAILED DESCRIPTIONS OF EXEMPLARY EMBODIMENTS AND THE APPENDED CLAIMS

The foregoing objects are accomplished in an exemplary embodiment by an automated banking machine that includes output devices such as a display screen, and input devices such as a touch screen, a keyboard, card reader or other type input device. The banking machine may further include devices such as a cash dispenser mechanism for sheets of currency, a printer mechanism, a depository mechanism and other transaction function devices that are used by the machine in carrying out banking transactions.

In an example embodiment, the banking machine is in operative connection with at least one computer. The computer is in operative connection with the output devices and the input devices, as well as with the cash dispenser mechanism, and other physical transaction function devices in the banking machine. The computer includes software programs that are executable therein. The software may include terminal control software which is operative to cause the machine to perform a plurality of different transaction functions.

In an example embodiment, the at least one computer of the automated banking machine is operative to cause the display to output a visual user interface. The user interface includes instructions and selectable options which visually guide a user through the operation of the machine. For example, the automated banking machine may include a hierarchical menu for navigating through a plurality of different user interface screens. Such menus may list various types of transaction functions which may be performed at the automated banking machine such as a withdrawal of cash or the deposit of a check. Although a consumer with normal vision can readily operate such an automated banking machine by following the commands visually presented through the display device, a consumer who is visually impaired may not be able to operate such an automated banking machine as easily.

In an example embodiment, the terminal control software of the exemplary embodiment may be operative to cause the machine to provide a visual and/or an audible user interface for guiding a consumer through the operation of the machine. In one exemplary embodiment, the terminal control software may be operative to cause the computer to output a visual menu for navigating between different user interface screens. Such screens may include transaction information and selectable options for operating the automated banking machine. For each visual user interface screen, the exemplary embodiment of the terminal control software may be operative to cause the computer to output corresponding audible outputs through external loudspeakers and/or an output device that is connectable to a set of headphones.

The audible outputs may include verbal instructions which describe the functions and operations available for the current state of the banking machine. Such audible verbal instructions may further include a description of which keys, buttons, transaction function devices, and other input devices to press, manipulate, or activate in order to perform the available machine functions and operations. In addition, such audible verbal instructions may further include a description of the relative locations of the keys, buttons, transaction function devices, and other input devices for performing the functions and operations. Further, such verbal instructions may include a description of how to use or manipulate the keys, buttons, transaction function devices, and other input devices of the banking machine. Such verbal instructions may also include a description of the input a user has provided. For example, to initially activate the automated banking machine, the audible verbal instructions may include a description of the location of a card reader of the machine and indicate in what orientation a card may be inserted and/or swiped in the card reader for purposes of being read. Further audible verbal instructions may describe the types of transaction functions that are available and which keys or other input devices may be pressed or manipulated in order to either select, modify, or cancel each of the transaction functions.

As used herein, the term "verbal" corresponds to spoken human language words generated by either a recording of a human voice or machine synthesized human voice emulation. In exemplary embodiments, audible verbal instructions may include a plurality of spoken words produced responsive to digital or analog recordings of either a human voice or computer synthesized voice. In addition, audible verbal instructions may be produced directly from hardware devices and/or software programs operating in the automated teller machine which are capable of synthesizing human language words, sentences, syllables and other human language communication sounds. Such hardware devices and/or software programs for example may include text to speech synthesizer devices which are operative to generate sound signals or audible outputs which include verbal instructions responsive to alphanumeric text.

In exemplary embodiments, the banking machine may be operative to automatically stop displaying visual information through the display screen (or may automatically increase the contrast of the visual indicia output through the display device) responsive to the detection of the operative connection of headphones to the machine by the user. For example, a computer associated with the automated banking machine may be operative to cause all or portions of the visual information typically displayed through the display screen regarding the operation of the machine and/or transaction information to be hidden from view (or be modified to have to a relatively higher contrast between text and background) when headphones or other audible output devices are placed in operative connection with the machine. When the headphones or other devices are removed from operative connection with the machine (or another predetermined input is received), the computer of the automated banking machine may be operative to automatically display the operational transaction visual information previously being hidden from view (and/or may be operative to modify the output visual indicia to have a relatively lower contrast between text and background) for its current state.

In another embodiment, the computer of the automated banking machine may be responsive to the detection of a connection of headphones or other device to prompt a user (via an audio output through the headphones and/or a message outputted on the display device) to provide a specified input(s) through an input device of the automated banking machine, if the user wishes to blank/hide transaction information on the display and/or to increase the contrast between text and background on the display. The computer of the automated banking machine may then be responsive to the specified input(s) to begin hiding information on the display and/or to increase the contrast of information outputted on the screen. Of course other approaches utilizing these principles may be used.

DETAILED DESCRIPTIONS OF EXEMPLARY EMBODIMENTS

Figure 1:
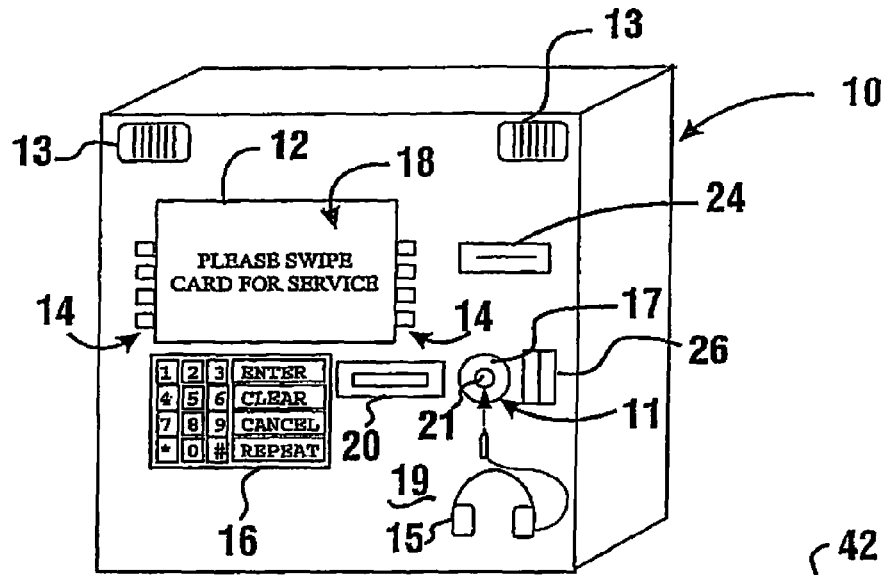
FIG. 1 is a perspective view representative of an exemplary embodiment of an automated banking machine.

Referring now to the drawings and particularly to FIG. 1, there is shown therein a perspective view of an exemplary automated banking machine such as an automated teller machine 10. The exemplary embodiment of the automated banking machine 10 includes output devices such as a display device 12 and external loudspeakers 13. The display device 12 is operative to provide a consumer with a user interface 18 that includes a plurality of screens or other outputs including selectable options for operating the machine. The external loudspeakers 13 may be operative to provide a consumer with audible music, beeps, signals, and/or verbal instructions for operating the machine.

The exemplary embodiment of the automated banking machine 10 may further include at least one output device such as an external port 11. The external port provides signals corresponding to audible or other machine outputs. In the exemplary embodiment of the automated banking machine 10, the external port 11 includes a speaker port such as a headphone port 21 for operatively connecting portable speaker devices such as a set of headphones 15 to the automated banking machine. In other exemplary embodiments, the external port 11 may comprise a wireless connection port. For example, in an alternative exemplary embodiment of the automated banking machine 10, the external port 11 may include a wireless communication device which is operative to communicate with a wireless headphone set or other external device capable of providing audible, visual or other user perceivable outputs. Such wireless communication devices may communicate with the external device using RF or IR signals, for example. The portable device that can be operatively connected through the port may include a portable device such as a smart phone.

In the exemplary embodiment, the external port 11 may include a base 17 with a useful shape that is not flush with the fascia 19 of the automated banking machine 10. The shape of the base 17 may have a distinctive contour which enables a consumer with impaired vision to quickly locate the external port by touching the fascia 19 and base 17 of the automated banking machine. For example, in one exemplary embodiment, the base of the external port may include a concave portion with a female headphone jack or port 21 positioned generally in the center of the concave portion. In further exemplary embodiments, the base 17 of the external jack may extend from the fascia 19 and have a distinctive contour or edge shape such as that of a square, circle, triangle, or other unique shape that is identifiable by touch.

The exemplary embodiment of the automated banking machine 10 may include a plurality of input devices such as function keys 14 and a keypad 16. The exemplary embodiment of the automated banking machine 10 may further include other types of input devices, such as a touch screen, microphone, card reader 26, biometric reader or any other device that is operative to provide the automated banking machine with inputs representative of user instructions or information. The exemplary embodiment of the automated banking machine 10 may further include a plurality of transaction function devices, such as a sheet or cash dispenser 20, receipt printer 24 and other devices.

Figure 2:
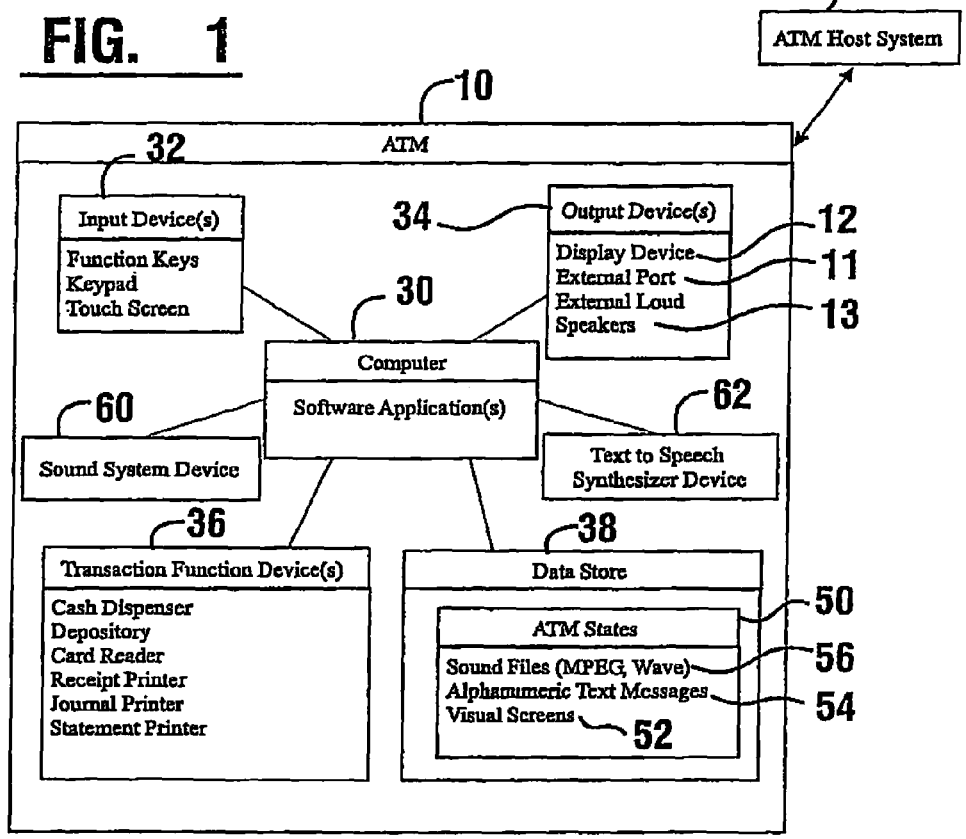
FIG. 2 is a schematic view of the exemplary embodiment of the automated banking machine.

FIG. 2 shows a schematic view of components which may be included in an exemplary embodiment of the automated banking machine and a system in which it is operated. The automated banking machine 10 may include at least one computer 30. Alternatively the computer may be disposed from the machine such as is shown in U.S. Pat. Nos. 8,205,792; 8,201,732; and 8,181,859 the disclosures of which are incorporated herein by reference in their entirety. The computer 30 may be in operative connection with the input device(s) 32, the output device(s) 34, the transaction function device(s) 36 and at least one data store 38. The exemplary embodiment further includes one or more software application(s) 40 operative in the computer 30. The software applications may include for example terminal control software, maintenance software, diagnostic software and any other software that enables the automated banking machine to perform transaction functions for users and/or enables authorized representatives of an operator of the automated banking machine to service, configure and maintain the automated banking machine. An exemplary embodiment of an automated banking machine may be operative to communicate with a host banking system 42 to enable a consumer to perform such exemplary transaction functions as withdrawing cash from an account through operation of the cash dispenser device 20, depositing checks or other items with the depository device, performing a balance inquiry for a financial account and transferring value between accounts.

The exemplary embodiment may be operative to provide a consumer with a user interface that may be visually displayed and/or output in audible form for the consumer. The exemplary user interface may guide the consumer through the selection of one or more functions which are to be performed by the automated banking machine. Such functions may include a plurality of different transaction functions such as dispensing cash, balance inquiries, deposits and transfers. However, such functions may also include options for navigating through the user interface such as functions for canceling or confirming a selection. Functions may also include options for configuring the user interface, such as changing the human language output through the user interface or changing the volume of the audio output of the automated banking machine. In addition, functions may also include options for making the user interface more user friendly, such as functions that repeat an audible instruction (either the entire instruction or a predetermined number of seconds of an ending portion of the instruction), or that provide help or a description for other functions of the automated banking machine.

The exemplary embodiment of the automated banking machine includes at least one software application such as a terminal control software program that at any given time is operative to be in one of a plurality of different conditions which are alternatively referred to as states. To perform transaction functions, the terminal control software may progress between the various states, prompting the user to input different types of information in some states and performing a transaction function in other states in response to the inputted information. The exemplary embodiment of the automated banking machine may operate to organize different transaction functions into a hierarchy using a plurality of menus and sub-menus (also referred to herein as "screens"). A menu may be visually and/or audibly output to the consumer for each of the different states the automated banking machine is operative to progress through to select and perform the transaction functions. Each menu may be operative to list those functions which may be performed in any given state of the automated banking machine. Selecting an option or function visually listed or verbally described in a menu may cause the automated banking machine to change to a different state which causes a display and/or output of an audible verbal description of a sub-menu of options or functions available to be performed by the automated banking machine in the new state.

The exemplary data store 38 of the automated banking machine may be operative to store therein, information for generating visible outputs and audible outputs that are representative of menus and sub-menus for a plurality of different states 50 of the automated banking machine. Such information, for example may include stored data for producing visible outputs such as visual screen data 52 for operative states of the automated banking machine. Such information may further include stored data for producing audio outputs such as MP3 or WAV sound files 56 which include verbal instructions for operative states of the automated banking machine. Such stored data for producing audio outputs may also include alphanumeric text messages 54 (also referred to herein as "text-to-speech data"), which may be used by the computer 30 to generate audible verbal instructions for operative states of the automated banking machine. In exemplary embodiments, the visual screen data 52 may be accessed by the computer and used to produce visible outputs through the display device 12. Also, the audio output data such as the sound files 56 and/or text messages 54 may be accessed by the computer and used to produce audible outputs with verbal instructions or descriptions through external loudspeakers 13 and/or headphones. In an exemplary embodiment, the automated banking machine may receive visual screen data and/or audio output data from a host banking system.

As shown in FIG. 2, the automated banking machine 10 may further include a sound system device 60 in operative connection with the computer. The exemplary sound system device 60 may be operative to produce signals that produce audible outputs. Such signals may be directed to the external port 11 and/or the external loudspeakers 13. In one exemplary embodiment, the sound system device may be operative to selectively mix and amplify a plurality of different audio input signals to generate an amplified audible output signal. Alternative exemplary embodiments of the automated banking machine 10 may further include a text to speech synthesizer device 62 which is operative to convert the text messages 54 into the verbal instructions or descriptions included in the audible outputs of the automated banking machine. The exemplary embodiment of the automated banking machine 10 may be designed to be used by consumers with normal vision as well as users who have impaired vision or who are blind. For example, a user with normal vision may view the display screen to read instructions for operating the automated banking machine 10. A user with impaired vision may listen to verbal instructions and descriptions output from the external loudspeakers 13. In addition, a user with impaired vision may operatively connect a personal set of headphones 15 or other device with the external port 11 of the automated banking machine to listen to verbal instructions and descriptions in private. As used herein, the phrases "verbal instructions" or "verbal descriptions" are used interchangeably, and may include verbal instructions, commands, descriptions, and/or any other verbal information.

In an exemplary embodiment, the computer associated with the sound system device 60 may be operative to detect the impedance change across the external port 11 when headphones 15 are electrically connected to the external port. Alternatively, in embodiments associated with a wireless port, a computer may operate to cause the port to sense for receipt of signals from a wireless device in order to detect operative connection of the port with such a device. Of course other approaches for detecting a connection may be used. When the connection is detected, the sound system device 60 and/or computer 30 may be operative to mute any audible output being directed to the external loudspeakers 13. The computer may then be operative to output private verbal instructions through the headphones which describe to the user how the automated banking machine may be operated. In exemplary embodiments, muting an audible output may include the computer or the sound system device operating to lower the volume level of the audible output through the external speakers to a generally silent level. Muting an audible output may also include stopping the playing or production of audio outputs by the computer or the sound system device.

Upon detection of the connection of the headphones or other external device to the external port, the sound system and/or the computer may be operative to change the volume level of the audible output being directed to the headphones or other device through the external port to a predetermined level. Such a predetermined level may correspond to a relatively low volume level that is not likely to cause discomfort to the majority of consumers using the automated banking machine. In the exemplary embodiment, the sound system may be in operative connection with one or more volume changing switches, keys, dials, buttons or other input devices which are accessible to the consumer. After the operative connection of the headphones or other device to the external port, the volume changing devices may be operated by the consumer to increase or decrease the volume level as desired by the consumer. In an exemplary embodiment, the sound system device and/or associated computer may further be operative to detect when the headphone has been disconnected from the external port. When this occurs the sound system and/or the computer may be operative to mute the audible output to the external port and institute the audible output through the external loudspeakers.

In alternative exemplary embodiments, a key of a keypad of the automated banking machine may be operative to control the volume of audio outputs. When a designated volume key of the keypad or other key is pressed or actuated, the computer may be operative to cause the automated banking machine to change the current volume level and audibly output a word such as "Volume" at the newly selected volume level For example, when a consumer presses the volume key of the keypad twice in succession, an exemplary embodiment of the banking machine may be operative to output the word "Volume" twice with the second occurrence of the word "Volume" being louder than the first occurrence. When the volume has reached a maximum level, the next time the volume key of the keypad is pressed, the exemplary embodiment of the automated banking machine may be operative to return the volume level to a predetermined minimum usable volume level and output a word such as "Volume" at the corresponding minimum volume level.

Figure 3:
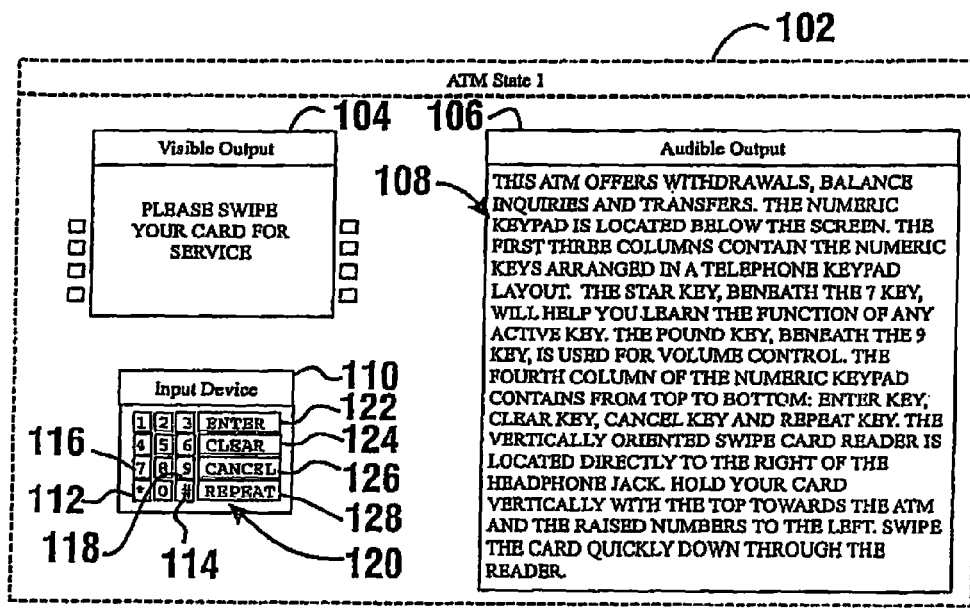
FIGS. 3-13 are schematic views of the exemplary embodiment of the automated banking machine in a plurality of different states of operation.

FIGS. 3-8 show schematic views of the automated banking machine 10 in a plurality of different states. Such states are examples of one exemplary path a consumer may take through the hierarchy of user interface menus for purposes of operating the automated banking machine 10. FIG. 3 shows the automated banking machine 10 in a first mode or state 102 which may be active when a user first approaches the machine. Here the automated banking machine is operative to attract or invite consumers to use the services of the automated banking machine. The exemplary embodiment of the automated banking machine may include a visible output 104 through a display device of the automated banking machine. The visible output may include indicia such as text which informs the consumer that the card may be swiped for initiating operation of the machine.

For users that are visually impaired, the exemplary embodiment of the automated banking machine may further be operative responsive to operation of at least one computer and data stored in at least one data store to output an audible output 106 through external loudspeakers or headphones of the consumer. Such an audible output 106 may include verbal instructions 108 which inform the consumer which types of transaction functions can be performed at the machine. The verbal instructions 108 may also describe the locations of input devices such as a keypad 110 of the automated banking machine and may describe the physical locations and/or configurations of the input devices. In addition, the verbal instructions may describe how the input device may be manipulated to select different functions of the machine and may further describe what the functions perform. Also, the verbal instructions may describe the location of transaction function devices and describe how the transaction function devices may be used.

For example, in the state shown in FIG. 3, the verbal instructions may indicate that the automated banking machine offers transaction functions such as withdrawals, balance inquiries and transfers. In addition the verbal instructions may indicate that the keypad 110 is located below the display device. Further, the verbal instructions may indicate that the keypad is organized similar to a telephone keypad. Also, the verbal instructions may describe the locations of certain keys of the keypad, including their function. For example, the star "*" key 112 may be indicated to be below the seven "7" key 116 and is operative to help the consumer learn the function of any active key. The pound "#" key 114 may be indicated to be below the nine "9" key 118 and is used for volume control. A fourth column 120 of keys in the exemplary keypad may be described as including from top to bottom an enter key 122, a clear key 124, a cancel key 126, and a repeat key 128. In exemplary embodiments, the verbal instructions 108 may further indicate that the swipe card reader is vertically orientated and is located to the right of the headphone jack. In exemplary embodiments, audible outputs may also indicate that the swipe reader is to be used by holding a credit or debit card vertically with the top toward the automated banking machine and with the raised numbers to the left and by swiping the card quickly down through the slot in the reader. Of course these outputs are exemplary and in other embodiments other approaches may be used.

Figure 4:
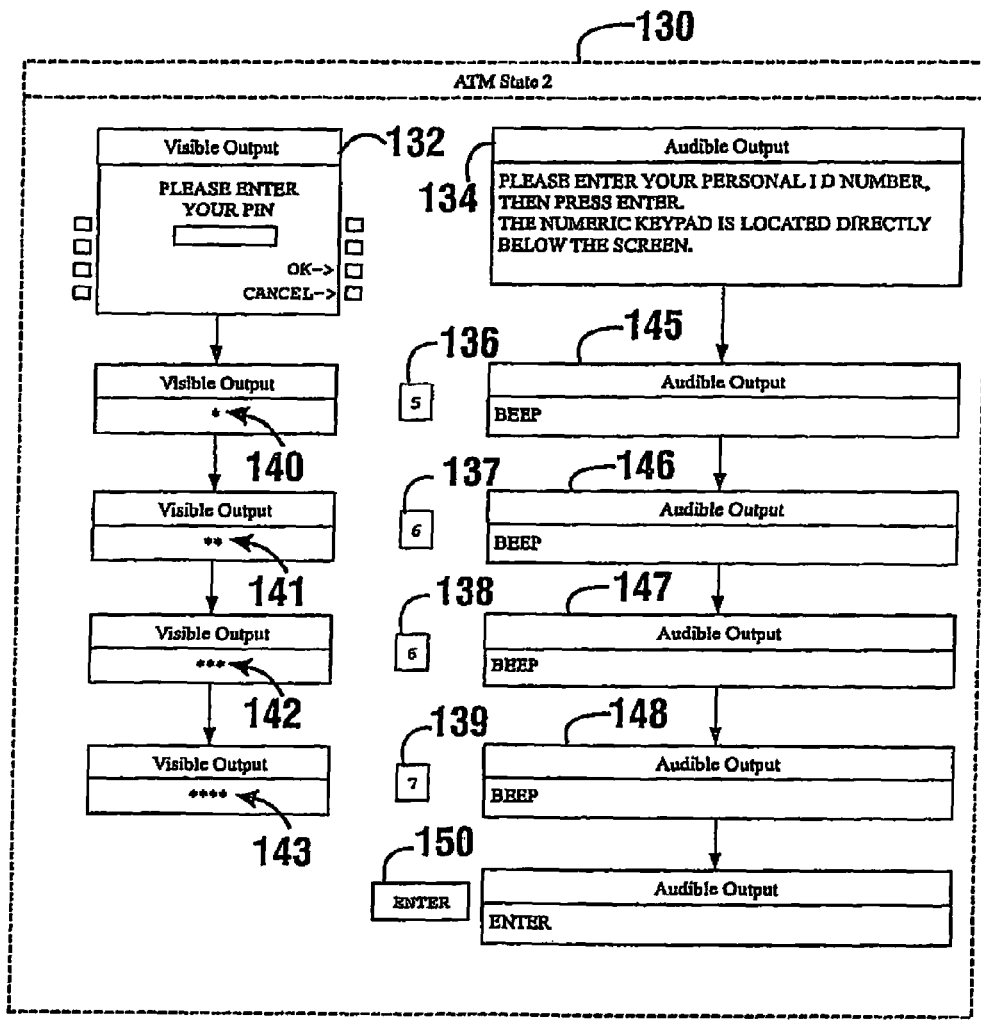

As shown in FIG. 4, the exemplary embodiment of the automated banking machine may be operative to change to a second state 130, after the consumer successfully swipes and/or inserts a card using the card reader of the automated banking machine. In this second state 130, the automated banking machine may be operative to accept the input of a Personal Identification Number (PIN). The visible output 132 and/or the audible output 134 produced when the automated banking machine is in this state, may request that the consumer enter a PIN. As a consumer presses each of the numeric keys 136-139 of the keypad which correspond to the consumer's PIN, the exemplary embodiment of the automated banking machine may be operative to visually and/or audibly acknowledge each input. For example, the visible output 132 may be updated with each key press to display an additional asterisk symbol 140-143. In addition, with each key press the automated banking machine may be operative to produce additional audible outputs 145-148 which may include a beep, or other sound acknowledging each input. When the user presses the enter key 150, the exemplary embodiment of the automated banking machine is operative to produce a further audible output which includes a verbal description representative of the enter key such as for example the word "ENTER."

In an alternative exemplary embodiment, upon the detection of the connection of the headphones or other external device to the external port, the computer of the automated banking machine may be operative to cause all or portions of the visible outputs typically provided through the display device of the automated banking machine for a particular state of the automated banking machine to be hidden from view. Hiding the visible outputs is operative to increase the privacy of the visually impaired person using the automated banking machine and prevent a person standing near the automated banking machine from spying on the transaction being performed at the automated banking machine by the visually impaired person.

In exemplary embodiments the computer may be operative to keep the entire screen blank while the headphones remain connected to the external port of the automated banking machine. In other exemplary embodiments, portions of the display screen may continue to display non-confidential information while private information associated with a transaction and/or the operation of the machine is only provided verbally through the headphones rather than being displayed on the display screen.

Examples of private information that is not shown through the display screen may include inputted numbers associated with an amount of cash to withdrawal or the value of an item being deposited such as a check. Other examples of private information not shown through the display device may include an account balance or any other transaction information that an automated banking machine is capable of displaying. Further other types of information not shown through the display device may include information which shows the current state of the automated banking machine, such as whether the automated banking machine is being used to withdrawal cash or deposit an item.

Upon detection of the headphones or other external portable device being disconnected from the external port, the computer of the automated banking machine may be operative to redisplay the visible outputs through the display device of the automated banking machine which correspond to the current state of the automated banking machine.

In exemplary embodiments where the display screen is not completely made blank while headphones are connected, the automated banking machine may be operable to display a visual message, advertisement, or other non-confidential information. For example a visual message may be displayed which states that the current visible output may be redisplayed by removing the headphones and/or by providing a specified input. For example, if the person using the automated banking machine has at least some vision ability, the person may prefer to both view visible outputs related to the transaction through the display screen of the automated banking machine and listen to the verbal instructions related to the transaction through headphones. In this embodiment, the computer of the automated banking machine may be responsive to the detection of a specified input through one of the input devices of the automated banking machine to cause the visual outputs for the current state of the automated banking machine to be redisplayed while continuing to output verbal instructions to the headphones.

In a further exemplary embodiment; upon the detection of the connection of an external portable device such as headphones to the external port, the computer of the automated banking machine may be operative to cause all or portions of the visible output through the display device of the automated banking machine to change from a relatively lower contrast to a relatively higher contrast with respect to the contrast between the text (or other indicia) and the background on which the text or other indicia is displayed. For example, a typical visual output through a display device may include a relatively lower contrast for the indicia with respect to the background, such as black text on a light grey background. In this described embodiment, such a relatively lower contrast visual output (e.g. with black text on a light grey background) may be changed to a relatively higher contrast visual output such as yellow text on a black background. Other examples of a higher contrast visual output may include white text on a black background, yellow text on a dark blue background, white text on a dark blue background, or any other relatively high contrast an arrangement between the hues of text and background compared to a prior visual output that is lower in contrast.

Also, it should be understood that these described colors of the text (or other indicia) and the background may correspond to colors that are substantially the same as described (e.g. substantially yellow, substantially black, substantially white, substantially dark blue, substantially grey).

As used herein and in the claims, the word substantially with respect to a described color corresponds to the indicia or background having the described color or having a variation of the described color that is closer to the described color than all of the other different colors in the set of: red, orange, yellow, green, blue, indigo, violet, white, grey, black, and brown. Also, it should be understood that as used herein, the terms "black" and "white" correspond to colors in which indicia and a background for a visual output is generated, even though black typically represents the absence of light, and white typically represents a combination of many different colors of light).

In addition, as used herein, a change in color of indicia (or the background) in order to increase/decrease contrast of a visual output of a display of an automated banking machine, corresponds to a change in color of the pixels of the display that form the indicia (or the background) from a first color to a second color wherein the second color has a substantially different hue that the first color. As used herein a substantially different hue would not include a mere change in brightness/intensity of an existing color such as a change from light grey pixels to darker grey pixels or for example a change in RGB values of pixels from (211,211,211) to (89,89,89). Rather, as used herein and in the claims a substantially different hue corresponds to a change from one color to another color with a visually perceptible change in hue such as a change in the visible pixels that form the indicia or a background from black pixels to yellow pixels or for example from RGB values of the pixels from (0,0,0) to (255,255,0).

In addition to changing colors of a visual output responsive to the detection of a connection of headphones or other specified input, example embodiments may be operative to change the relative contrast between text and background by changing the intensity, brightness, size, font type, boldness, and/or other shape characteristics of indicia displayed on a background, so that the indicia is relatively easier to read. Thus, as defined herein a relatively higher contrast visual output with respect to indica on a background corresponds to a visual output that is relatively easier to read by a visually impaired user compared to the same type of indica displayed with a relatively lower contrast.

To carry out these described example embodiments, the previously described computer 30 and software instructions associated with the automated banking machine 10 may be operative to switch the display 12 from outputting the relatively lower contrast visual output to the relatively higher contrast visual output (or to hide at least some of the indicia on the display) responsive to the detection of the operative connection of headphones 15 (or other device) with the external port 11. Also, the computer of the automated banking machine may be operative to switch the display from outputting the relatively higher contrast visual output to the relatively lower contrast visual output (or redisplay hidden indicia) responsive to the detection of the disconnection of the headphones 15 with the external port 11.

Example embodiments may also include an input device (e.g., a button, switch, capacitive touch sensor) adjacent the display device, external port 11, or other location on the housing of the automated banking machine, inputs through which input device is operative to cause the computer to change or toggle the visual output of the display device between the relatively lower and higher contrasts between the text and background (and/or toggle the visual output of the display device between hiding and redisplaying all or portions of the text displayed on the display device). Example embodiments may also enable the computer of the automated banking machine to toggle the visual output of the display device between the relatively lower and higher contrasts (and/or hide/redisplay text) and/or to change the size or form of indicia included in visible outputs responsive to inputs through a touch screen associated with the display, and/or inputs through other input devices on the automated banking machine such as a keypad 16 and function keys 14.

In addition, rather than automatically increasing the relative contrast and/or automatically hiding text or other indicia, and/or changing indicia size or font of indicia, responsive to the detection of a connection of a portable external device (e.g., headphones), example embodiments of the computer of the automated banking machine may be operative to output a prompting message responsive to the detection of a connection of a portable external device. Such a prompting message may indicate and inform the user (e.g., audibly through the headphones and/or via a message on the display device) that the contrast can be increased, changes in text size or form can be provided, and/or the text can be hidden on the display by providing a specified input through an input device of the automated banking machine. The computer of the automated banking machine may then operate responsive at least in part to the specified input to increase the contrast, change the indicia, or hide indicia being outputted on the display screen. As discussed previously, the contrast may then be lowered and/or the text redisplayed on the display device responsive to the detection of the disconnection of the portable external device and/or responsive to a specified input through an input device of the automated banking machine.

Figure 5:
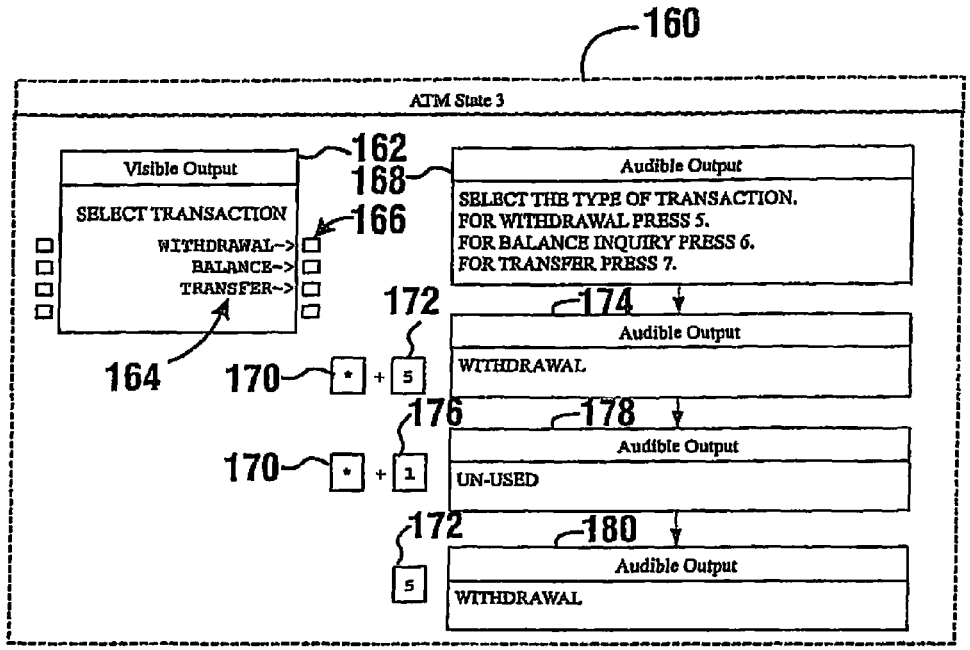

Referring to FIG. 4, once the consumer inputs a PIN and presses the enter key 150 of the keypad, the exemplary embodiment of the automated banking machine may be operative to change to a third state in which the automated banking machine is operative to enable the consumer to select one of a plurality of transaction functions to be performed with the automated banking machine. As shown in FIG. 5, when the automated banking machine is in a third state 160 the automated banking machine may produce a visible output 162 which lists the transaction functions 164 and visually points to the function keys 166 that are operative to select each transaction function.

In the exemplary embodiment of the automated banking machine, this described third state may cause the computer in the automated banking machine to produce audible outputs 168 which describe which keys of the keypad are operative to select certain transaction functions. For example, in this described embodiment it may be indicated that the five "5" key may be actuated to select a withdrawal, the six "6" key may be actuated to select a balance inquiry, and the seven key "7" may be actuated to select a transfer.

In the exemplary embodiment, the automated banking machine may be operative to provide a consumer with help to learn which keys perform which functions. For example, if the consumer wishes to verify that the five "5" key corresponds to a withdrawal transaction function without actually selecting a withdrawal transaction function, the consumer may press the star "*" key of the keypad prior to pressing the five "5" key. In this described exemplary embodiment the star "*" key may indicate to the automated banking machine that the next following key is to be verbally described or named. As shown in FIG. 5, when the consumer presses the star"*" key 170 followed by the five "5" key 172, the automated banking machine may be operative to produce a further audible output 174 which verbally indicates the name of the function such as "Withdrawal." When a help key such as the star "*" key 170 is actuated in this embodiment, the automated banking machine may only describe the function associated with the next key press rather than changing to a further state corresponding to such a key press.

If the consumer presses the star "*" key 170 followed by a key that is not associated with a function in the current state, such as the one "1" key 176, the exemplary embodiment of the automated banking machine may be operative to produce a further audible output 178. The further audible output may verbally indicate that the key is not being used in the current state of the automated banking machine with an expression such as "Un-used."

Figure 6:
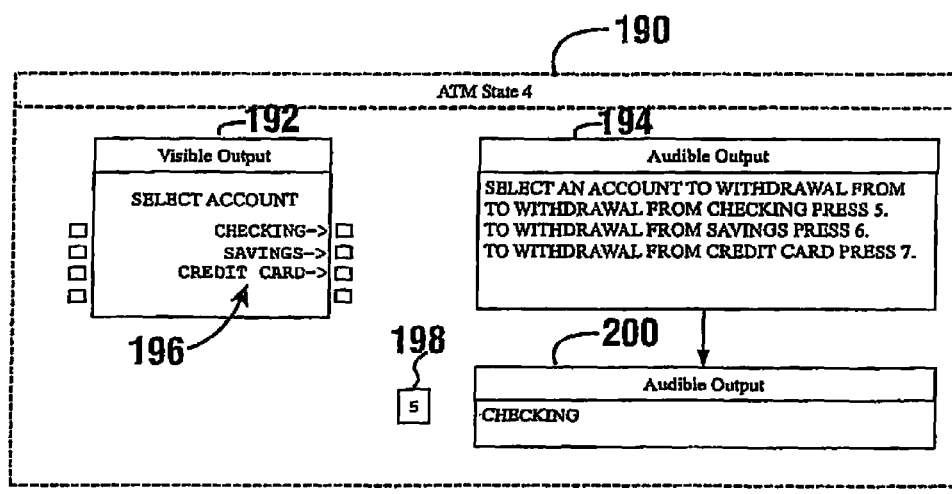

In an exemplary embodiment, the second key for which the user wishes to receive an indication of the function may be pressed within a predetermined time period after the star "*" key 170 is pressed. Such a time period may for example be ten seconds. Of course, these approaches are exemplary and in other embodiments other approaches may be used. In the exemplary embodiment, when a consumer selects a transaction by pressing a key associated with the transaction, such as the five "5" key 172 without pressing the star"*" key 170, the automated banking machine may be operative to change to a fourth state and produce another audible output 180 which verbally indicates to the user the name of the selected function. As shown in FIG. 6, the fourth state 190 may include a visual and/or an audible request that the consumer select or input additional information associated with the performance of the selected transaction function. With a withdrawal transaction, the fourth state may include a visible output 192 which lists the type of accounts 196 that the consumer may select for purposes of making the withdrawal. An audible output 194 may likewise verbally output a list of the types of accounts along with a corresponding key of the keypad to press for selecting each account. As discussed previously, when the consumer selects a key, the exemplary embodiment of the automated banking machine may be operative to produce a further audible output 200, which verbally describes what the consumer has selected. For example, if the consumer presses the five "5" key 198, the audible output 200 may indicate the name of the selection by outputting word such as "Checking."

Figure 7:
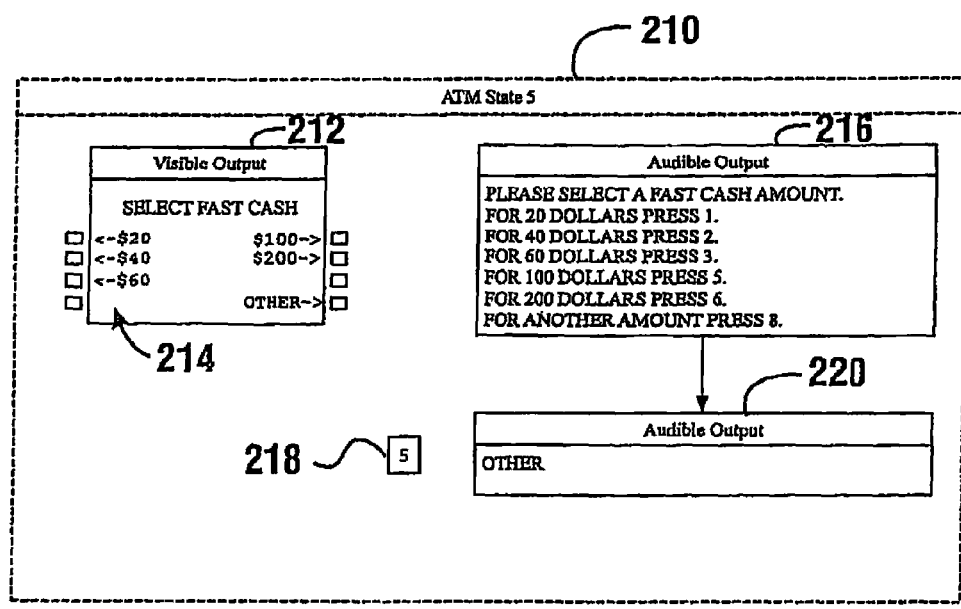

For a withdrawal transaction function, the exemplary embodiment may change to a further state after a selection of an account has been made. FIG. 7 shows an example of a fifth state 210, in which the automated banking machine may be operative to accept the selection of an amount of cash to be withdrawn. Here, the automated banking machine may be operative to produce a visible output 212 which lists a plurality of currency amounts 214 which may be selected. Likewise, the automated banking machine may be operative to produce an audible output 216 which verbally indicates which keys of the keypad to press in order to select a particular currency amount.

Figure 8:
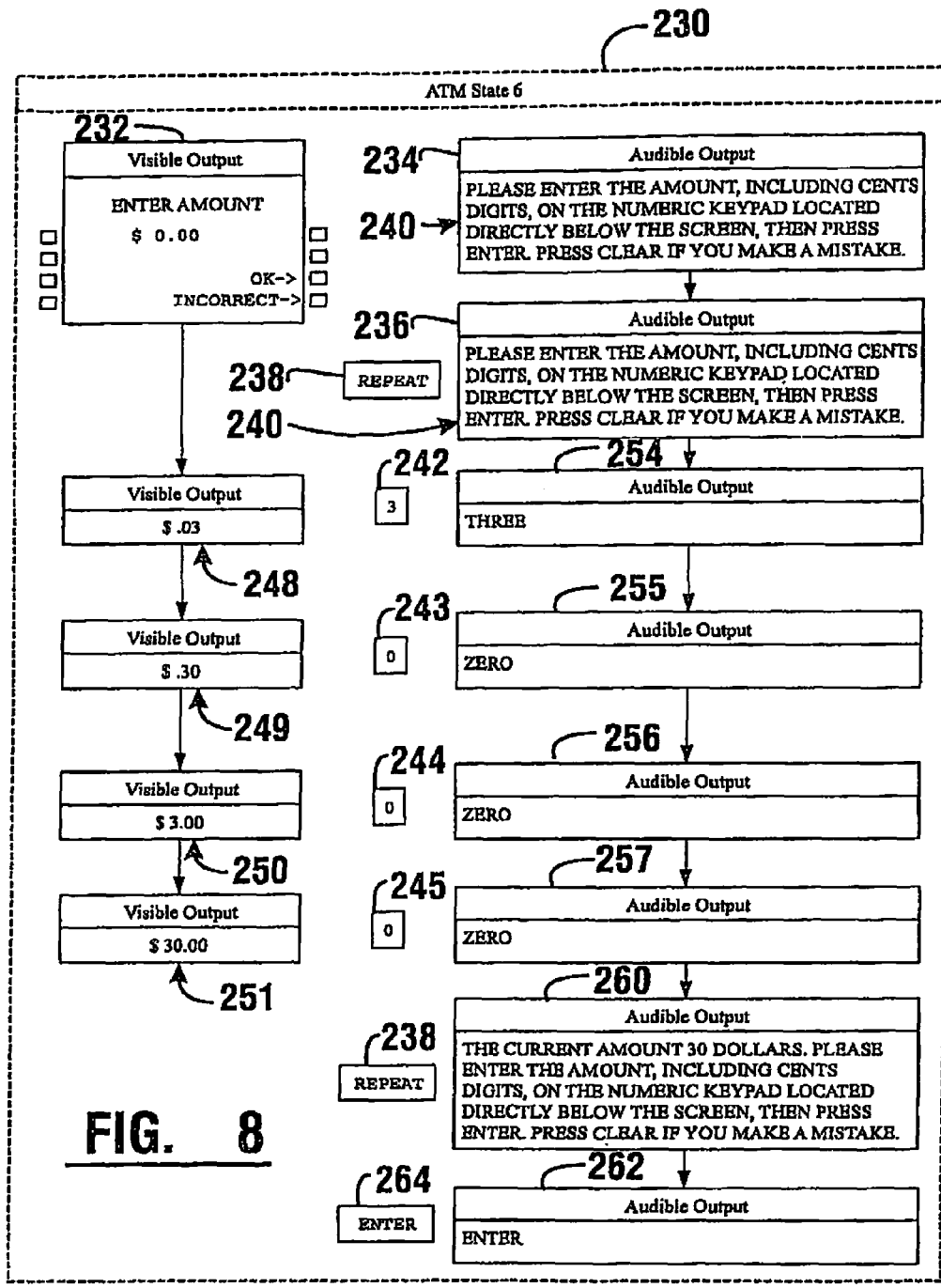

In this described exemplary embodiment, the five "5" key 218 corresponds to the selection of another amount for a withdrawal. When this key is pressed, while the automated banking machine is in the fifth state, the automated banking machine is operative to cause the automated banking machine to change to a sixth state and is operative to produce a further audible output 220 which verbally describes this selection with a word such as "Other." As shown in FIG. 8, when the exemplary embodiment of the automated banking machine is in a sixth state 230, the automated banking machine may be operative to enable the consumer to enter a specific amount of cash to withdraw, which amount may be other than one of the predetermined amounts previously presented. Here, the automated banking machine may be operative to produce a visible output 232 which requests that the consumer enter an amount for the withdrawal in a currency such as dollars. The exemplary embodiment of the automated banking machine may further be operative to produce an audible output 234 which verbally requests that the consumer enter an amount which includes a fractional currency portion such as cents on the keypad.

If for some reason the consumer did not hear or understand all of the verbal instructions 240 of the audible output 234, the computer of the exemplary embodiment of the automated banking machine may be operative to enable the consumer to cause the automated banking machine to repeat the verbal instructions 240 (either all of the last verbal instruction or a predetermined number of seconds of the end of the verbal instruction). In an exemplary embodiment, the computer of the automated banking machine may be operative to produce a further audible output 236 which includes a repeat of the verbal instructions 240 (or portion thereof) responsive to the consumer pressing a repeat key 238 of the keypad. If the repeat key is pressed before the verbal instructions 240 in the audible output 234 have been completely outputted, the computer of the automated banking machine may be operative to interrupt the audible output 234 and immediately begin outputting the further audible output 236. The further audible output 236 may then repeat the verbal instructions 240 from the beginning (or repeat of a predetermined number of seconds before the point when the repeat key was pressed). In other exemplary embodiments, the computer of the automated banking machine may be operative to produce further audible outputs 236 which include a repeat of the verbal instructions 240 responsive to actuation of any unused key of the keypad which is not associated with another function or a selection available in the current state of the automated banking machine. In further embodiments, additional or alternative input devices may be configured to function as the described repeat key.

In embodiments that are capable of repeating a predetermined number of seconds of the verbal instructions responsive to activation of the repeat key (or other input device), the computer of the automated banking machine may be operative to detect the quick succession of multiple activations of the repeat key (or other input device) within a predetermined amount of time of each other. Such multiple activations of the repeat key (or other input device) may cause the computer of the automated banking machine to repeat the entire verbal instructions, rather than only the described predetermined amount of seconds of the verbal instruction.

When the consumer enters an amount of a withdrawal by pressing the number keys 242-245, the exemplary embodiment of the automated banking machine may be operative to update the visible output 232 to produce visible outputs 248-251 with indicia representative of the current amount entered. Also, the automated banking machine may be operative to produce further audible outputs 254-257 which verbally describe the number associated with the key that was pressed. In the exemplary embodiment, as each key is pressed, the automated banking machine may be operative to determine a new current amount of value. The last two keys pressed may correspond to the fractional portion of the amount such as the cents portion in U.S. currency. The current amount may be stored in a memory or buffer in operative connection with the computer of the automated banking machine. Pressing the repeat key 238 while a withdrawal amount has been or is being entered, may cause the automated banking machine to produce a further audible output 260 which verbally indicates the current amount stored in the memory of the automated banking machine. In an exemplary embodiment, the audible output 260 may also include a repeat of the verbal instructions 240.

Figure 9:
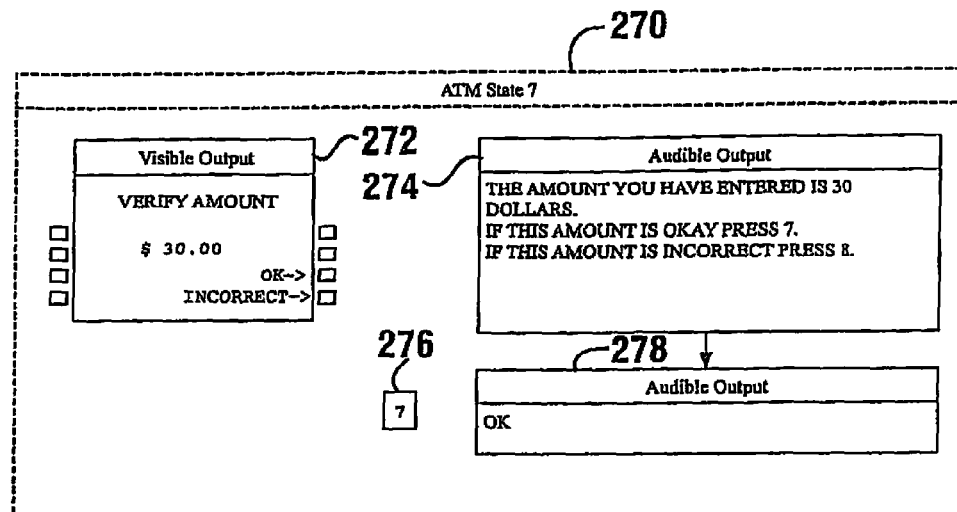

When the consumer has completed entering an amount, the consumer may press the enter key 264. Pressing the enter key may cause the automated banking machine to change to a seventh state and produce another audible output 262 which verbally describes that the enter key has been pressed. FIG. 9 represents the automated banking machine in a seventh state 270. Here, the exemplary embodiment of the automated banking machine may be operative to produce a visible output 272 which requests that the consumer verify that the amount entered in the preceding state is correct. The automated banking machine may also be operative to produce an audible output 274 which verbally indicates the current amount entered and requests that the consumer press keys of the keypad to verify that the amount is either correct or incorrect. In this described exemplary embodiment, the consumer may verify the amount by pressing the seven "7" key 276 of the keypad. When the seven "6" key is pressed, the automated banking machine may be operative to produce an audible output 278 that verbally indicates a description of the selection by outputting a word such as "OK."

Figure 10:
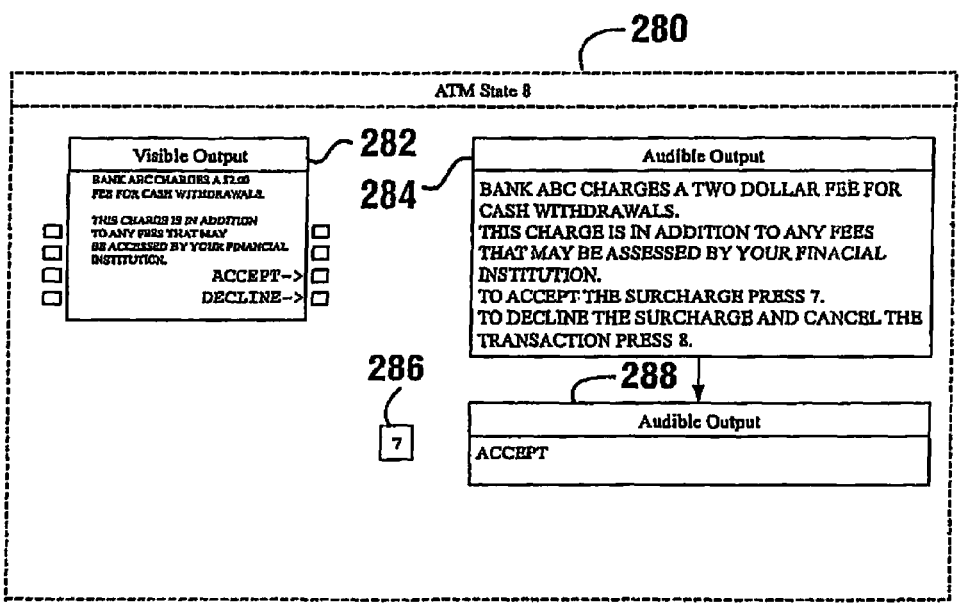

Once an amount has been verified by the consumer, if the automated banking machine is configured to charge a surcharge for the transaction, the automated banking machine may change to a further state such as the eighth state 280 shown in FIG. 10. Here, the exemplary embodiment of the automated banking machine may be operative to produce a visible output 282 which discloses the fee for the withdrawal and requests that the user accept or decline the surcharge. The automated banking machine may further be operative to produce an audible output 284 which verbally describes the fee and indicates which keys of the keypad may be pressed in order to accept or decline the surcharge.

Figure 11:
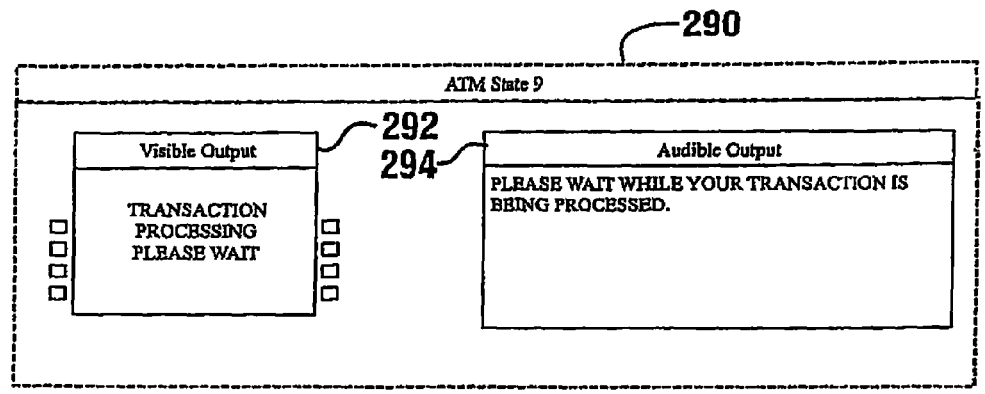
Figure 12:
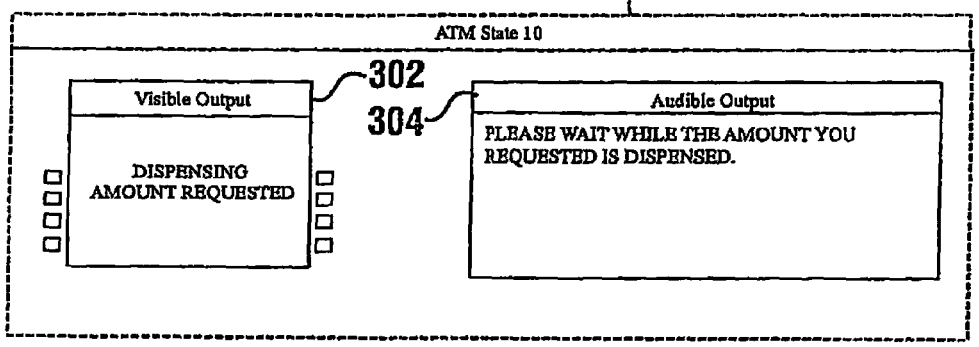

If the consumer accepts the charge by pressing the seven "7" key 286 for example, the automated banking machine may be operative to produce the further audible output 288 which verbally indicates that the user has accepted the surcharge by outputting a word such as "Accept." Once a consumer has accepted the surcharge (if applicable for the transaction), the exemplary embodiment of the automated banking machine may be operative to change to a ninth state 290 represented in FIG. 11 in which the automated banking machine produces a visible output 292 and/or an audible output 294 which indicates that the transaction is being processed. Once the withdrawal has been authorized, the automated banking machine may be operative to change to a tenth state 300 represented in FIG. 12. In this state the exemplary embodiment of the automated banking machine may produce a visible output 302 and/or an audible output 304 which indicate that the automated banking machine is in the process of dispensing the requested amount.

Figure 13:
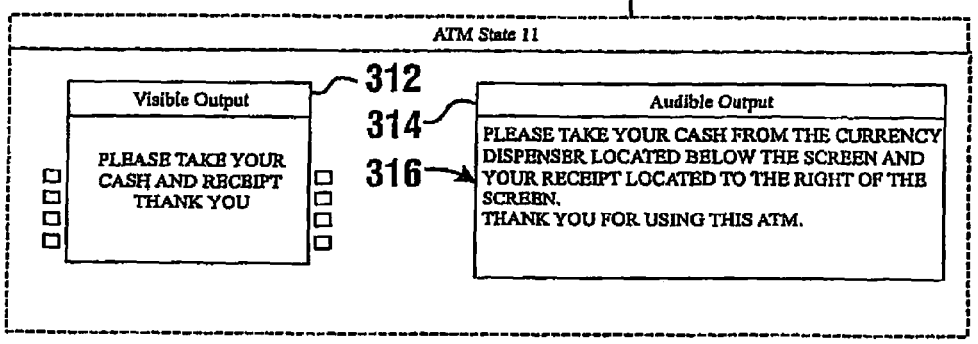

Once the exemplary embodiment of the automated banking machine has dispensed an amount of cash with the cash dispenser that corresponds to the requested amount, the automated banking machine may be operative to change to an eleventh state 310 as represented in FIG. 13. In the eleventh state the automated banking machine may be operative to produce a visible output 312 and/or an audible output 314 which indicate that the consumer may take the dispensed amount of cash and a receipt from the automated banking machine. In addition, the verbal instructions 316 of the audible output may further describe the locations of the opening through which cash is delivered and the opening through which a receipt is delivered on the automated banking machine.

Once the transaction function has been completed, the exemplary embodiment of the automated banking machine may return to a previous state such as the described third state 160 shown in FIG. 5 for selecting another transaction or the described first state 102 shown in FIG. 3 for attracting new consumers. It is to be understood that the described automated banking machine states, visible outputs, and audible outputs are examples of performing only one type of transaction with the exemplary embodiment. Other transaction functions for the described automated banking machine and alternative exemplary embodiments of the automated banking machine may have additional and/or other types of automated banking machine states, visible outputs, and audible outputs.

In some exemplary embodiments, pre-existing automated banking machines which do not offer a user interface for the visually impaired may be upgraded to include some or all of the previously described features. Such an upgrade may include installing new terminal control software that is operative to cause the computer to direct the previously described audible outputs through a sound system device of the automated banking machine. Such upgraded terminal control software may further be operative to cause the automated banking machine to repeat verbal instructions, provide verbal help for selections, and/or change the volume of the audible output as described previously.

Figure 14:
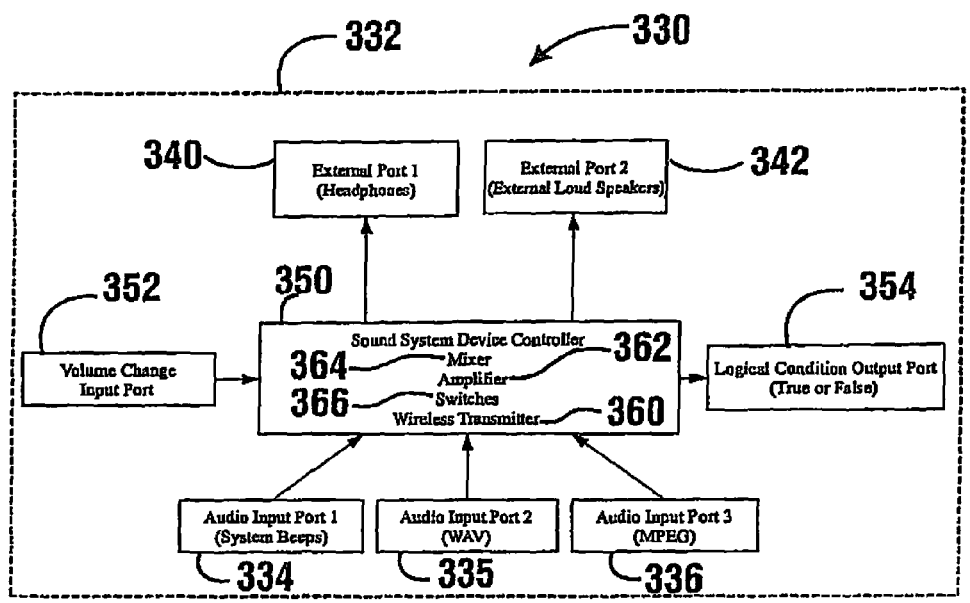
FIG. 14 is a schematic view representative of an exemplary audio system.

In addition, such an upgrade of a pre-existing automated banking machine may include the installation of an audio system that is operative to further enable an automated banking machine to have some or all of the previously described features. FIG. 14 shows an example of an audio system 330 which is adapted to provide an automated banking machine with support for headphones 340 using an exemplary embodiment of a sound system device 332. The sound system device 332 may be adapted to accept one or more audio signals through audio input ports 334-336. Such input ports may be connected to the output ports of one or more audio output devices of the automated banking machine. For example, such audio output devices of an automated banking machine may include a sound card that is operative responsive to operation of the computer associated with the automated banking machine to produce sound signals from WAV or MP3 files. In addition, the automated banking machine may include audio output devices for generating audio signals with beeps and other prompting sounds to assist a consumer in operating the automated banking machine. Also, the exemplary embodiment of the automated banking machine may include a text-to-speech synthesizer audio output device and/or software which is operative to produce audio signals with verbal instructions responsive to alphanumeric text-based instructions included in visual display outputs. For example, the computer of the automated banking machine may execute text-to-speech software that is operative to produce audio signals with verbal instructions responsive to the text displayed on the display device of the automated banking machine (e.g. text included in screen data received from a host system). Further embodiments, of the text-to-speech software may be configured to produce audio signals with verbal instructions responsive to text data in files associated with or referenced by the screen data used to generate visual screens on the display device of the automated banking machine.

In addition, further examples may use text-to-speech software to produce audio signals responsive to other text associated with the automated banking machine. For example, automated banking machines may be operative to print receipts, statements, tickets, and/or other items which include information (e.g. account balance amount, cash dispensed amount, account data, and/or other transaction information) that may or may not be displayed on the display device. The computer of an automated banking machine may be operative to produce audio signals with verbal information describing at least some of the text and numbers printed (or being printed) via a printer to produce a transaction receipt (or other item) responsive to the text and numbers printed (or being printed).

The exemplary sound system device 332 may include a controller 350 which comprises at least one computer that is operative to manipulate one or more audio signals individually through the audio input ports 334-336. The controller 350 may include an amplifier 362 and mixing circuits 364 which are operative to selectively amplify and mix the audio input signals together to produce one or more amplified audio signals. Such amplified audio signals may be selectively directed by the controller 350 through one or more of the external ports 340, 342 of the sound system device. In an exemplary embodiment, the external ports 340, 342 correspond to speaker ports that are adapted to releasably connect to headphones and external loudspeakers. In the exemplary embodiment, the sound system device 332 may include one or more selectable adjustable switches 366 such as jumpers, dip switches, or other electronic switches which can be configured to set relative amplification and other characteristics for mixing one or more audio signals received from the audio input ports 334-336.

In an exemplary embodiment of the sound system device 332, the controller may be in operative connection with a volume change input port 352. The volume change input port 352 may be operative to receive electrical signals responsive to the operation of one or more volume controls such as a momentary switch, key, button or other consumer accessible switch. The controller 350 may be configured to cycle through one of a plurality of volume levels responsive to the electrical signals received from the operation of the volume control. The controller 350 may be operative to amplify the amplified audio signals responsive to the currently selected volume level. When the volume level reaches a maximum level, the exemplary controller may be operative to change the volume level to a predetermined minimum level responsive to the next electrical signal received from operation of the volume control.

In this described exemplary embodiment, the automated banking machine may include a volume control such as a button adjacent the keypad which is in operative connection with the volume change input port 352 of the sound system device 332. However, in other exemplary embodiments, the controller may be operative to receive volume changing signals from the computer of the automated banking machine. Terminal control software may be configured to detect events such as the clicking of a pound "#" key of the keypad and cause the computer to output a volume changing signal to the sound system device.

As discussed previously, the sound system device may be operative to mute amplified audio signals being directed through the external port 342 for external loudspeakers, responsive to the sound system device detecting the connection of headphones or other devices with the external port 340. In an exemplary embodiment the controller 350 may be operatively configured to detect the impedance change across the external port 340 when headphones are electrically connected to the external port. For wireless or other types of ports computerized detection of certain signals or other properties may be used to detect a connection. In the exemplary embodiment, when the connection is detected the controller 350 may be operative to switch off any amplified audio signals being directed to the external port 342 for the external loudspeakers.

In addition, upon detection of the connection of the headphones or other devices the controller 350 may be operative to change the volume level of the amplified audio signals being directed to the external port 340 for the headphones to a predetermined level selected from one of the plurality of volume levels produced by the sound system device. Such a predetermined level may be configured with a jumper, dip switch, or other selectable switch associated with the sound system device. The predetermined level for example may be set to a volume Level that is loud enough to be capable of being heard by almost all consumers, but is sufficiently low to be unlikely to cause discomfort to the majority of consumers using headphones with an automated banking machine.

In the exemplary embodiment, the controller may further be operative to detect when the headphone has been disconnected from the external port 340 for the headphones. When this occurs the controller may be operative to mute the amplified audio signals to the external port 340 for the headphone and institute the delivery of amplified audio signals to the external port 342 for external loudspeakers.

Also, in the exemplary embodiment, the controller 350 may be in operative connection with a logical condition output port 354 that is adapted to communicate with the computer. The controller 350 may be operative responsive to the detection of the headphones connected to the external port 340 for the headphones, to set the logical condition output port 354 to an electrical condition representative of true or on. When the controller 350 detects that the headphones are no longer connected to the external port 340 for headphones, the controller may be operative to set the logical condition output port 354 to an electrical condition representative of false or off.

The exemplary embodiment, the computer of the automated banking machine may be configured to poll or monitor the condition of the logical condition output port 354. The terminal control software may be configured to turn on or off audible outputs being directed to the audio input ports 334-336 of the sound system responsive to the current condition of the logical condition output port 354. Thus for example, when the headphones are not attached, the exemplary embodiment of the automated banking machine may be configured to output system beeps and other prompting sounds through the external loudspeakers. However, when headphones are connected and the condition of the logical condition output port 354 changes to true or on, the exemplary terminal control software may be programmed to begin producing signals corresponding to audio output with verbal instructions for operating the machine which is directed to the headphones.

In further alternative exemplary embodiments, the sound system device may further include a wireless transmitter 360. Such a transmitter may be operatively configured to transmit a wireless audio signal through an external port of the sound system device. Such a wireless audio signal may be received by a wireless receiver of the consumer such as wireless headphones, a smart phone or other suitable external device usable by the consumer for receiving outputs from the automated banking machine.

In alternative embodiments, the wireless audio signal may be encrypted by the automated banking machine to minimize possible eavesdropping on the transaction by a third party. Such encryption may include a handshaking protocol between the automated banking machine and the headphones or other wireless receiver device of the consumer which verifies that the consumer currently accessing the automated banking machine is the only party that can decipher the audio signals in the wireless transmission from the automated banking machine. For example, in one exemplary embodiment, wireless audio signals between the headphones and the automated banking machine may be transmitted using wireless network technology such as BlueTooth or IEEE 802.11.

In such embodiments, the automated banking machine may output to each consumer within range of the automated banking machine a verbal message which includes a unique session code. When the consumer has access to the machine, the consumer can enter their unique access code before entering a PIN. Based on the unique access code entered, the automated banking machine may then direct the audio signals related to operating the automated banking machine only to the set of wireless headphones which originally received the access code from the automated banking machine.

In further exemplary embodiments, the automated banking machine may be configured to direct private wireless audio signals to the headphones or other receiver device of the consumer based on information retrieved from the card or other input used to access the automated banking machine by the consumer. For example, such information from or correlated with data on the card or other input may enable the automated banking machine to retrieve or determine a private network address, encryption key, digital certificate, or other information associated with the headphones of the consumer, which may be used by the automated banking machine to establish secure and private communications with head phones or other wireless devices of the consumer.

In further alternative exemplary embodiments, the handshaking protocol between the automated banking machine and the wireless headphones or receiving device used by the consumer may be based on a biometric input received from the consumer currently accessing the automated banking machine. Such biometric input for example may include a fingerprint scan, facial recognition system or other biometric scan of the consumer. The automated banking machine may then selectively send private wireless audio signals only to that set of headphones which is operatively configured with information that corresponds to the biometric input corresponding to the particular user.

The exemplary embodiments of an audible user interface system and method have been described for use with an automated banking machine such as an automated banking machine. However, it is to be understood that one or more of the features described related to providing an audible user interface may also be used in other self-service terminals such as voting machines and kiosks.

As discussed previously, exemplary embodiments of automated banking machines may output verbal instructions in response to alphanumeric text messages 54. Such automated banking machines may include a text-to-speech device 62 which includes at least one computer and/or text-to-speech software which is operative to convert the alphanumeric text messages 54 to verbal audible outputs. As discussed previously, such alphanumeric text messages 54 are also referred to herein as text-to-speech data.

The text-to-speech data may be stored in a local data store of the machine. For example, in one exemplary embodiment, text-to-speech data may be included in one or more tiles stored on a hard drive of the machine. One or more of the text-to-speech files may be associated with visual screen data 52 also stored on the machine for use with generating visible outputs through the display device of the machine. In exemplary embodiments, screen data 52 may specify which text-to-speech files to access for use with generating audible outputs during the display of the visible outputs.

In exemplary embodiments, the text-to-speech data may be transferred to the machine from a remote server such as a host banking system. Although, in exemplary embodiments, host banking system software may be updated to accommodate the transfer of text-to-speech data to automated banking machines, alternative exemplary embodiments may include a method of using existing or legacy host banking systems to transfer text-to-speech data to an automated banking machine. Such a method may include providing monitoring software on the automated banking machine which is capable of detecting and retrieving text-to-speech data from legacy messages originally designed for other types of automated banking machine configuration data.

For example, legacy automated banking machine protocols such as Diebold 91x may include messages which are operative to transfer screen data to automated banking machines from a host banking system. Such legacy protocols for transferring screen data may include attributes which are associated with or are used to label the screen data being transferred using the protocol. Examples of such attributes associated with screen data messages may include a screen name/number and a bank number.

An exemplary embodiment of the described monitoring software may be operative to cause at least one computer to monitor one or more of such attributes in the screen data messages. Screen data messages which include text-to-speech data may include predefined values for one or more of these attributes which the monitoring software is operative to recognize as indicating that the screen data message includes text-to-speech data. When such predefined attributes are detected the monitoring software is operative to read the text-to-speech data from the screen data messages and store the text-to-speech data on the machine.

In an exemplary embodiment the attributes used to indicate the presence of text-to-speech data in the screen data messages may also be used to specify, label, or describe features of the text-to-speech data. For example the attributes may be used to identify the human language associated with the text-to-speech data (e.g., English or Spanish). Such attributes may also provide information usable by the monitoring software to label or name the text-to-speech data. For example, the following data may be included in a screen data message sent to an automated banking machine from a host banking system:

015 900 [E]_000 Please select your transaction. For a withdrawal press 1. To make a deposit, press 2. To transfer money, press 3

An exemplary embodiment of the monitoring software may be operative to monitor the attribute associated with the bank number for values which indicate that the screen data message includes text-to-speech data. In this described exemplary embodiment, bank numbers greater than or equal to 900 are used to specify that text-to-speech data is present in the message. When bank numbers greater than or equal to 900 are detected by the monitoring software, the monitoring software may be operative to use the information provided in the screen data message to generate a text-to-speech file.

In an exemplary embodiment, the text-to-speech file generated may be placed in a predetermined and/or configurable directory on the machine. In other exemplary embodiments, the text-to-speech file may be placed in a directory specified by the screen data in the message. For example, in an exemplary embodiment the bank number may be used to specify a name of a directory on the hard drive of the machine to store the text-to-speech file. Each directory may correspond to a different human language, so that all text-to-speech files stored in a particular directory correspond to the same human language.

In the above example, the screen data message includes the bank number of 900. In exemplary embodiments, a bank number with a value of 900 may correspond to a human language such as English. Also, in such exemplary embodiments, a bank number with a value of 901 may correspond to another human language such as Spanish.

When the screen data is associated with the bank number with the value of 900, the monitoring software may be operative to generate and store a corresponding text-to-speech file in a directory reserved for English language text-to-speech files. Whereas, when the screen data is associated with the bank number with the value of 901, the monitoring software may be operative to generate and store a corresponding text-to-speech file in a directory reserved for Spanish language text-to-speech files.

In one exemplary embodiment, text-to-speech directories may include names which correspond to all or portions of the bank number or other attribute which are used to specify the human language of the text-to-speech data. For example, text-to-speech files may be placed in a directory with a name that corresponds to one or more of the digits of its associated bank number. Thus text-to-speech files associated with the bank number of 900 may be placed in a directory with a name such as "lang000," while text-to-speech files associated with the bank number of 901 may be placed in a directory with a name such as "lang001." Likewise, text-to-speech files associated with the bank number of 902 may be placed in a directory with a name such as "lang002." In this described exemplary embodiment, one or more of the digits or other characters which distinguish between the different bank numbers or other attributes may be used in the name of corresponding directories used to store the text-to-speech files.

In exemplary embodiments, other data or attributes associated with the screen data message may be used by the monitoring software to generate a name for the generated text-to-speech file. For example, in the above example, the screen data message includes a screen name attribute with a value of "015." This screen name may be included in the name of the generated text-to-speech file. Also, in the above example, the screen data following the bank number includes a letter "E" in brackets. The monitoring software may also be operative to identify the letter between the brackets following the bank number and use the identified letter in the name of the file.

As a result, the corresponding file name generated by the monitoring software from the above example of a screen data message may include the characters "E015." In exemplary embodiments, the monitoring software may include other characters in the file names such as a descriptive prefix and extensions. In one exemplary embodiment, generated text-to-speech files include a prefix such as "TT" and an extension such as "htm." For the above example of screen data, the corresponding text-to-speech file name would be "TTE015.htm."

In exemplary embodiments, the monitoring software may be operative to generate text-to-speech files which include HTML tags, Java script, VB script, XML, and/or other code which is operative to cause the automated banking machine to generate audible outputs responsive to the text-to-speech data stored in the file. For example, in the above example, the screen data following the brackets may correspond to text-to-speech data. The monitoring software may be operative to place this text-to speech data in an HTM file along with HTM tags, Java script and/or other interpreted code which is operative to cause the automated banking machine to process the text-to-speech data with text-to-speech devices 62 and/or software on the machine.

In one exemplary embodiment, the HTM text-to-speech file may reference an Active X control or other external software. The automated banking machine may include a browser or other HTML responsive software which is operative to read the HTM text-to-speech file and in response to the file access and/or send the screen data as an argument to an ActiveX control. The ActiveX control may be programmed to accesses and/or cause the text-to-speech device or software of the automated banking machine to convert the text-to-speech data to Corresponding audible outputs.

In the above example, the text-to-speech device and/or software would output verbal instructions representative of the spoken command "Please select your transaction. For a withdrawal press 1. To make a deposit, press 2, To transfer money, press 3."

In an exemplary embodiment, the text-to-speech data may include additional attributes which are not intended to be spoken but are intended to configure the operation of the text-to-speech device and/or software. In the above example, the screen data begins with the four characters "_000." The text-to-speech device and/or software may be responsive to these characters to determine which human language to use when generating verbal instructions from the text-to-speech data. For example, the beginning characters "_000" may correspond to the human language English. As a result, the text-to-speech device and/or software may convert the subsequent text-to-speech data to audible outputs which correspond to an English pronunciation of the text-to-speech data.

In the exemplary embodiment, the terminal control software operative in at least one computer of the machine may be operative to access the text-to-speech files responsive to screen data files. Thus, when the automated banking machine produces a visible output responsive to a particular screen data file, the screen file may reference an associated text-to-speech file which describes the features of the visible output.

With the above described exemplary embodiment, both visual screen data and associated text-to-speech data can be updated on an automated banking machine using standard or legacy automated banking machine protocols and messages from a host banking system. In addition, for each state of an automated banking machine, screen data and associated text-to-speech data may be downloaded to the PC in multiple languages. Depending on the language preference of the user operating the machine, terminal control software in the automated banking machine is operative to access the screen data and text-to-speech data which corresponds to the language preferred by the user.

In further exemplary embodiments, the monitoring software may be operative to monitor screen messages for the presence of screen data and responsive thereto, saving the screen data in an AS CIT text format or other format in a single display screen file on the hard drive of the automated banking machine. Further, the monitoring software may be operative to monitor for the presence of state messages from a host banking system. The monitoring software may be operative responsive to the detection of a state message to retrieve state information from the messages and store the state information in a single state file.

In further exemplary embodiments, the monitoring software may be operative to store screen data that comes from a host banking machine in a Diebold OAR message or as part of a screen update data field in a function command message.

In exemplary embodiments, HTML code accessible to the automated banking machine for generating user interfaces for operating the automated banking machine may include the use of the "A" symbol or other symbol or tag which causes an HTML responsive program (such as a browser) to access one of the described text-to-speech, display screen, or state files generated by the monitoring software.

For example HTML code for generating a user interface may include the command "0 154. The "^" symbol may be detected by the browser accessing the HTML code and in response thereto the browser may access a text-to-speech file such as "ITS 154.TXT" from the appropriate language director such as lang000. The text-to-speech file 'TIS 154.TXT' may have been created by the monitoring software responsive to a screen message as discussed previously. In another example, the "^" or other symbol or tag may reference a display screen file generated using the monitoring software such as the display screen file "SCR035.bct." The data from the display screen file may be incorporated into a visual display screen generated by the automated banking machine. By referencing such text-to-speech, visual display screen, or state files from HTML code, the automated banking machine can be dynamical updated to display visual or output audible information representative of different surcharge amounts, or low bill denominations without having to alter the programming of the host system software.

A further exemplary embodiment may include a sound configuration software component which is operative to aid a technician with the process of configuring an automated banking machine to provide audible outputs with verbal instruction. In one exemplary embodiment, the sound configuration software may be located on a portable medium such as a CD/DVD disk or other storage medium. The portable medium may be placed in a corresponding reading device of the automated banking machine (e.g., CD/DVD reader) and the sound configuration software may be executed from the portable medium.

In an exemplary embodiment, the sound configuration software may be operative to cause at least one computer to configure and/or update an automated banking machine to include sound software and/or data necessary to enable the automated banking machine to generate audible outputs with verbal instructions. Such sound software may include text-to-speech synthesizer software, the previously described monitoring software, and/or any other sound system related software or data.

The sound configuration software may also be operative to copy from the portable medium verbal instruction data (e.g., text-to-speech files, WAY files, and/or MP3 files) which corresponds to display screens provided by the automated banking machine which are not typically retrieved from a host. For example, automated banking machines may include an offline screen if the automated banking machine is powered on without having a communication connection with a host banking system. Automated banking machines may also include an out of service screen if they have communication with the host established but have not received screen messages from the host. Automated banking machines may also include screens to handle situations where a transaction will require a particular device which is currently being serviced or where the device requires interaction with the user. For these described screens, the sound configuration software may be operative to copy from the portable medium verbal instruction data to the automated banking machine which is operative to cause the automated banking machine to generate audible outputs which verbally describe these screens.

In addition, manufacturers of automated banking machines often produce many different models of automated banking machines with different physical shapes and sizes. Different models may have the display screen, keypad, cash dispenser, and other devices positioned in different locations with respect to each other. Further, even for the same model of automated banking machines, the positions of some devices may be located in a plurality of different positions depending on the preferences of the owner and/or operator of the automated banking machine.

Because the audible outputs from the automated banking machine may include verbal instructions which describe the location of the devices on the automated banking machine, different automated banking machines may require verbal instruction data which is customized to the physical configuration of the automated banking machine.

In this described exemplary embodiment, the sound configuration software may cause the computer of the automated banking machine to output a tutorial which prompts the technician to input information representative of what devices are installed on the automated banking machine and/or where on the automated banking machine the devices are located. For example, not all automated banking machines include a depository mechanism or coin dispenser. Thus, an exemplary embodiment of the sound configuration software may query the technician to determine whether a depository mechanism or coin dispenser is present. If a depositary mechanism is determined by the configuration software to be present, the sound configuration software may further query the technician to determine the location of the depositary mechanism relative a fixed point such as the screen or other landmark on the automated banking machine.

In exemplary embodiments, the sound configuration software may further query the technician as to the type of devices installed on the automated banking machine. For example, automated banking machines may include different types of card readers such as an insert reader, swipe reader, vertical DIP reader, or horizontal DIP reader. An exemplary embodiment of the sound configuration software may be operative to prompt the technician to select which type of card reader is installed.

Based on the answers provided by the technician, the sound configuration software may cause at least one computer to copy data files from the portable medium to the hard drive of the automated banking machine which are operative to correctly configure the automated banking machine to provide audible outputs customized to the physical configuration of the automated banking machine. As a result, after the sound configuration software has configured the automated banking machine, the automated banking machine may be operative response to at least one computer to provide audible outputs with verbal instructions which accurately describe the locations of devices (e.g., "to the right of the monitor") and their method of use (e.g., "insert card" or "swipe card vertically").

In an exemplary embodiment, the answers provided by the technician associated with the location and/or type of devices installed on the automated banking machine may be stored in a data store on the automated banking machine. A tutorial included with the sound configuration software may present configuration options for the sound software being configured responsive to the data in this data store. In exemplary embodiments, this data store may remain on the hard drive of the automated banking machine. Thus the next time the sound configuration software is executed from the portable medium, the tutorial may proceed using the data provided by the technician previously rather than forcing the technician to re-answer each question regarding the location and/or type of devices on the automated banking machine. However, exemplary embodiments of the sound configuration software may also enable the technician to update the data stored in the data store as needed.

In further exemplary embodiments, the portable medium may be customized for different customers of the manufacturer of the automated banking machines. For example, a customer may have a relatively small set of combinations of automated banking machine models and associated devices. For this customer, a custom portable medium may be created which includes sound configuration software which prompts the user with questions specific to the range of automated banking machine models and associated devices the customer is expected to have. Thus, if the customer only has insert type card readers, the sound configuration software on the customer specific portable medium may be operative to not prompt the technician as to the type of card reader installed on the automated banking machine. Further, the customer specific portable medium may include audible output data which generates audible outputs specific to the customer. For example, a text-to-speech file associated with a welcome screen of the automated banking machine may include the name of the customer (e.g., "Welcome to Bank XYZ").

Thus, the automated banking machine audible user interface system and method of exemplary embodiments achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of example embodiments, the manner in which they are constructed and operated, and the advantages and useful results attained; the new and useful structures, devices, elements, arrangements, parts, combinations, systems, equipment, operations, methods and relationships are set forth in the appended claims.

The invention claimed is:

1. A tangible, non-transitory computer readable medium of instructions for execution by a processor associated with an automated banking machine, the automated banking machine comprises a display and an external port, and the instructions when executed are operable to:
   cause the display to output a visual output including indicia on a background, which indicia is representative of a plurality of selectable operational options for the automated banking machine;
   detect an operative connection of a portable device with the external port;
   cause at least a portion of the visual output to change from a relatively lower to higher contrast between at least a portion of the indicia and the background responsive to detecting the operative connection of the portable device with the external port;

output a user prompt through one of a group consisting of the display, the external port, and both the display and the external port, wherein the prompt is indicative that a specified input through an input device associated with the automated banking machine will cause a change in contrast for at least a portion of the visual output; and cause at least a portion of the visual output to change from a relatively lower to higher visible contrast between the indicia and the background respective to receipt of the specified input.

2. The computer readable medium set forth in claim 1, wherein the external port is operable to enable a headphone to be releasable connected with the automated banking machine.

3. The computer readable medium set forth in claim 1, wherein the automated banking machine further comprises an input device, the instructions are further operable to cause at least a portion of the visual output to change from relatively higher to lower visible contrast between indicia and the background responsive to receipt of a predetermined input received by the predetermined input device.

4. The computer readable medium set forth in claim 1, wherein to cause at least portions of the at least one visible output to change from relatively lower to higher visible contrast, the instructions are operable to cause at least portions of the indicia to change from being substantially not yellow to substantially yellow.

5. The computer readable medium set forth in claim 4, wherein to cause the at least portions of the at least one visible output to change from relatively lower to higher visible contrast, the at least one computer is operative to cause at least portions of the background that surround at least portions of the indicia, to change from being substantially not black to substantially black.

6. The computer readable medium set forth in claim 1, the instructions for causing at least a portions of visual output to change from relatively lower to higher visible contrast are operable to cause the indicia to change from substantially black to substantially yellow.

7. The computer readable medium set forth in claim 1, the instructions are further operable to cause the at least portions of the at least one visual output through the display to change from relatively higher to lower visual contrast between at least portions of the indicia and the background responsive at least in part to detection of operative disconnection of the portable device from the external port.

8. The computer readable medium set forth in claim 7, the instructions to cause at least a portion of the at least one visual output to change from relatively higher to lower visible contrast are operable to cause the portions of the indicia to change from substantially yellow to substantially not yellow.

9. The computer readable medium set forth in claim 8, the instructions to the least portion of the visual output to change from relatively higher to lower visible contrast are operable to cause at least portions of the background that surround the at least portions of the indicia to change from being substantially black to substantially not black.

10. The computer readable medium set forth in claim 1, the instructions to cause at least a portion of the at least one visual output to change from relatively higher to lower visible contrast are operable to cause the portions of the indicia to change from substantially yellow to substantially black.

11. The computer readable medium set forth in claim 1, wherein the automated banking machine further comprises an input device, the instructions are further operable to cause the display to not output visible information associated with a financial transaction, and concurrently to cause the external port to provide signals usable to produce audible outputs through the portable device which include verbal information associated with the financial transaction responsive at least in part to receipt a first predefined input through the input device.

12. The computer readable medium set forth in claim 11, the instructions are further operable to cause the display to output a message indicative that information not being shown through the display may be outputted through the display by providing a second predefined input through the input device responsive at least in part to receipt of the first predefined input.

13. The computer readable medium set forth in claim 12, the instructions are further operable to cause the display to output visible information associated with the financial transaction, and concurrently to cause the external port to provide signals usable to produce audible outputs through the portable speaker device which include verbal information associated with the financial transaction responsive at least in part to receipt of the second predefined input.

14. The computer readable medium set forth in claim 1, wherein to cause the at least portions of the at least one visible output to change from relatively lower to higher visible contrast, the instructions are operable to cause at least portions of the indicia to have a larger relative size.

15. The computer readable medium set forth in claim 1, wherein the automated banking machine further comprises a data store that includes data indicative of relative locations of user accessible portions of a plurality of hardware devices associated with the automated banking machine, the instructions are further operable to:

acquire from the data store, data indicative of a location of a user accessible portion of at least one of the hardware devices of the automated banking machine;

configure the external port to provide signals usable to produce audio outputs through the portable device including verbal information that conveys the location of the user accessible portion of the at least one hardware device to a user using the automated banking machine responsive at least in part to the acquired data.

16. The computer readable medium set forth in claim 1, wherein the automated banking machine further comprises an input device, the instructions are further operable to:

cause at least one first audio output signal corresponding verbal instructions to be outputted through the external port; and to cause at least one second audio output signal to be outputted through the external port, wherein the at least one second audio output signal corresponds to a repeat of at least portions of verbal instructions responsive to an input received through the input device.

17. The computer readable medium set forth in claim 16, wherein the at least one second audio output signal corresponds to a repeat of a predetermined time amount of an ending portion of the verbal instructions.

* * * * *